United States Patent [19]

Berkowitz et al.

[11] Patent Number: 5,488,561
[45] Date of Patent: Jan. 30, 1996

[54] MULTIVARIABLE PROCESS CONTROL METHOD AND APPARATUS

[75] Inventors: Peter N. Berkowitz; Michael N. Papadopoulos, both of Houston; Larry W. Colwell, Friendswood; Martin K. Moran, Houston, all of Tex.

[73] Assignee: Continental Controls, Inc., Houston, Tex.

[21] Appl. No.: 398,598

[22] Filed: Mar. 3, 1995

Related U.S. Application Data

[63] Continuation-in-part of Ser. No. 932,155, Aug. 19, 1992, Pat. No. 5,396,416.

[51] Int. Cl.$^6$ ............................ G06F 19/00; G05B 13/02
[52] U.S. Cl. ............................................. 364/165; 364/150
[58] Field of Search .................................. 364/148–151, 364/156–159, 153, 163, 164, 161, 165, 162, 176, 177, 183; 318/561

[56] References Cited

U.S. PATENT DOCUMENTS

| | | | |
|---|---|---|---|
| 4,616,308 | 10/1986 | Morshedi et al. | 364/159 |
| 4,714,988 | 12/1987 | Hiroi et al. | 364/165 |
| 4,889,600 | 12/1989 | Meier et al. | 203/2 |
| 4,905,160 | 2/1990 | Maunce et al. | 364/166 |
| 4,935,886 | 6/1990 | Choka | 364/146 |
| 5,043,863 | 8/1991 | Bristol et al. | 364/165 |
| 5,396,416 | 3/1995 | Berkowitz et al. | 364/165 |

*Primary Examiner*—Roy N. Envall, Jr.
*Assistant Examiner*—Thomas E. Brown

[57] ABSTRACT

On-line control of a process is achieved by feedforward computations of manipulated variable setpoints modified during each of frequent optimization cycles by feedback trim determined by actual versus predicted effects of setpoint changes on the process controlled variables. Process, economic, contractual and equipment parameter values are continuously polled and collected and used to compute the optimal setpoints for the manipulated variables before the feedback trim is applied. Drift factors are added to the feedback trim to provide on-line calibration of key measuring instruments. Drifts in process performance are updated on-line periodically through self-tuning routines computed as calibration factors for predictor and control equations based on rigorous process simulations and actual plant performance. The equations take the form of polynomials in which each term contains an adjustable coefficient and one or more variable process parameter. The tuning factors are automatically applied at chosen time intervals to minimize the size of the feedback corrections computed during every optimization cycle. Tuning changes are effected by multiplying all terms of the predictor polynomials by the same factor. Effects of changes in process equipment are also accounted for on-line through calibration routines wherein individual coefficients in the polynomials are modified to reflect the equipment change in the apparatus. Optimization cycles typically occur every thirty seconds, and the system is capable of handling wide fluctuations in operational and economic parameters.

20 Claims, 4 Drawing Sheets

MULTIVARIABLE PROCESS CONTROL METHOD AND APPARATUS

CROSS REFERENCE TO RELATED APPLICATION

This application is a continuation-in-part of U.S. Patent application Ser. No. 07/932,155, filed on Aug. 19, 1992, to be issued as U.S. Pat. No. 5,396,416 on Mar. 7, 1995.

BACKGROUND OF THE INVENTION

1. Technical Field

The present invention pertains to a method and apparatus for optimizing plant process operations such as, but not limited to, alumina refining, fractionation, cryogenic expansion and gas processing and treating. More particularly, the invention is directed to a method and apparatus for improving feedforward, plural variable control techniques in plant process operations.

2. Discussion of the Prior Art

As pointed out in U.S. Pat. No. 4,349,869 (Prett et al), it is important to minimize losses inherent in the processes performed in industrial plants, and it is likewise important to simultaneously manage profits. Prett et al recognize that feed-forward control is important to the optimization process because it permits the user to initiate controller action based upon a prediction of the values of controlled variables. The patent points out that prior feed-forward controllers have certain inherent problems based on the fact that the controllers have no "knowledge" as to what effect their controlled condition will have elsewhere in the overall process, thereby requiring operator intervention to alleviate problems. In addition, prior systems are described as being unable to handle "large scale" feed flow disturbances, on the order of 10 to 15%, that are considered usual in petroleum cracking processes, for example. As a solution to that problem, Prett et al provide a method for controlling and optimizing operation of a process having plural input variables, plural independently manipulated variables and plural controlled variables that are dependent on the input variables and the manipulated variables. The input variables themselves—e.g., input flows, compositions, etc. may or may not be subject to manipulation but are classified as manipulated variables for the purposes of this discussion. The method involves introducing test disturbances in the manipulated variables and then measuring the effect on the controlled variables, thereby permitting the response characteristics of the controlled variables (to a given change in one of the manipulated variables) to be readily calculated. The existing values of the manipulated variables and the controlled variables can then be measured, and the calculated response of the controlled variables may be used to calculate a new set of moves for the manipulated variables. The manipulated variables can then be adjusted in accordance with the new set of moves to reach a new set of values. These moves, when implemented, have the effect of moving the controlled variables toward their optimum setpoints. A feature of the Prett et al system is that it allows the formation of a projection to some future time of future controlled variable values. In the same manner, a number of future moves of each manipulated variable may be calculated to control the future values of the controlled variables to their desired operating points. Thus, feed-forward control is implemented by predicting, at one or more points in the future, the response of a process to changes in the manipulated variables. Based on the predicted trend of the process, a number of future moves for the manipulated variables can be calculated to minimize the error between the desired setpoint and the predicted future response of the process. Importantly, feedback is used to predict—and hence minimize—setpoint error.

The system described above has a number of limitations, not the least of which is an inability to respond to truly large scale variations in the feed-forward parameters such as throughput and composition, and to volatile economic conditions affecting the system. In this context, "truly large scale" means variations on the order of one hundred percent or more. For example, the system disclosed in the Prett et al patent performs a cracking process in an oil refinery. The raw material (e.g., crude oil) is typically available in storage tanks containing two to three weeks supply for the system, thereby enabling the system operator to control the inflow rate and composition within fairly narrow limits. However, in gas processing fractionation systems, or in other systems wherein large supplies of the raw material are not capable of storage, such operator control is hardly feasible. Considering the gas fractionation situation, the incoming gases typically arrive directly by pipeline from remote locations, usually without any control by the plant operator as to the time, rate of arrival, or composition of the total stream. The result is a large and random variation at the front end of the system, i.e., in the raw material. Similarly, at the back end of the plant there are typically no storage tanks for the output product as in the case of petroleum cracking processes; rather, the outflow from the gas fractionation process (typically cleaned gas and natural gas liquids) proceeds directly to the pipeline.

Processes such as gas fractionation are also affected by economic parameters that are much more volatile than economic parameters affecting the final product of the Prett et al system. Federal regulation has relegated the gas transportation industry to a common carrier status, effectively precluding the carriers from contracting to purchase gas from the producers and then contracting to sell it downstream to users. As a consequence, most gas is sold on a spot market characterized by significant and frequent price variation. Although the system described in the Prett et al patent can accommodate changes in economic conditions, it can only do so by being shut down and being reconfigured to function with changed parameters. Such down time and off-line reconfiguration is totally impractical for industries such as the natural gas industry where economic parameters are extremely volatile.

In a fundamental sense, the Prett et al model is limited in that it is only mechanistic rather than based on the physics and chemistry of the processes being controlled.

OBJECTS AND SUMMARY OF THE INVENTION

It is an object of the present invention to provide a method and apparatus for optimizing plant process control whereby truly large scale variations in input conditions can be accommodated online, i.e., without interrupting the process.

It is another object of the present invention to provide a method and apparatus for optimizing plant process control whereby highly volatile economic parameters affecting the processed product can be accommodated on-line.

Another object of the present invention is to provide an improved method and apparatus of employing feed-forward control in a process so as to render the control arrangement continuously adaptive to wide fluctuations in uncontrolled parameters affecting the process, as well as to changes in process equipment efficiency.

It is still another object of the present invention to provide a multivariable advanced control system for on-line optimal control of continuous processes, the optimal control being achieved by continuously simulating the fundamental physico-chemical processes occurring in the plant, and by means of a reduction in plant operating variability, tighter specification targets and improved control over variable cost.

In accordance with the present invention, feed-forward control is periodically optimized at regular short term intervals (e.g., every thirty seconds) by utilizing a feedback trim based on actual versus predicted process results to assure that the feed-forward control does not produce an anomalous effect. Control is based on rigorous process simulation of actual plant performance conducted on-line. Multiple field variables are polled on a continuous basis to provide input signals for predicting in a feed-forward manner the optimal manipulated variable setpoints required to achieve desired results in controlled variables. The feedback trim is computed before each feed-forward-based setpoint control is applied to the system and serves as a "sanity check" of the predicted plant output parameter versus the measured plant output parameter, the latter being subject to vary due to non-linearities between unit loading and unit performance efficiency. The measured output parameters are filtered to accommodate drift factors, thereby effectively providing on-line calibration of measuring instruments. The filtered, feedback-corrected, optimal manipulated variable setpoint computation, and its application to the process, occurs every control cycle (e.g., typically on the order of every thirty seconds).

Replacement, addition or deletion of equipment (and concomitant changes in process performance), such as the addition of exchangers, piping, etc., are automatically accommodated through system self-tuning routines. In this regard, predictor equations utilized in the on-line system simulation are re-linearized by means of a recomputation of the coefficients of the predictor equations. The purpose of changing the coefficients rather than the simulation model is that small coefficient corrections provide greater tuning alignment without invalidating the structure of the model. Accordingly, the predictor equations remain similar for given process operations and thereby minimize the need to modify the model as long as the basic function of the process unit remains the same.

The multivariable control approach of the present invention permits efficient and optimal control over the entire range of normal plant operations and of plant economics (usually, but not limited to ±25% of process units' loads, and/or to several-fold in composition, and/or to the widest variation in economic parameters). Important to this feature is the fact that the rigorous, robust multivariable equations, linear and non-linear polynomials of high order, solve for the non-linear behavior of the process and, hence, the non-linear nature of the manipulated process gains; whereas the mechanistic approaches are limited to fixed gain solutions (i.e., they are confined to a narrow process range). Filtering is employed for both live measurements and manual data entry since single point variations can have a significant effect on model output predictions. Essentially, it is the repeatability of instrument performance, rather than the absolute instrument accuracy, that is of key importance in data filtering and reconciliation.

The present invention relieves the operator from the need to constantly readjust setpoints and from the burden of over using resources (such as utilities) in order to remain safely within specification. The multivariable control system of the present invention achieves continuous optimum operation of a process unit through on-line prediction and control of setpoints for the key process variables in the unit. This is achieved under the constantly changing conditions encountered, with robust solutions requiring a minimum of operator intervention, customization or update effort in response to plant change.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
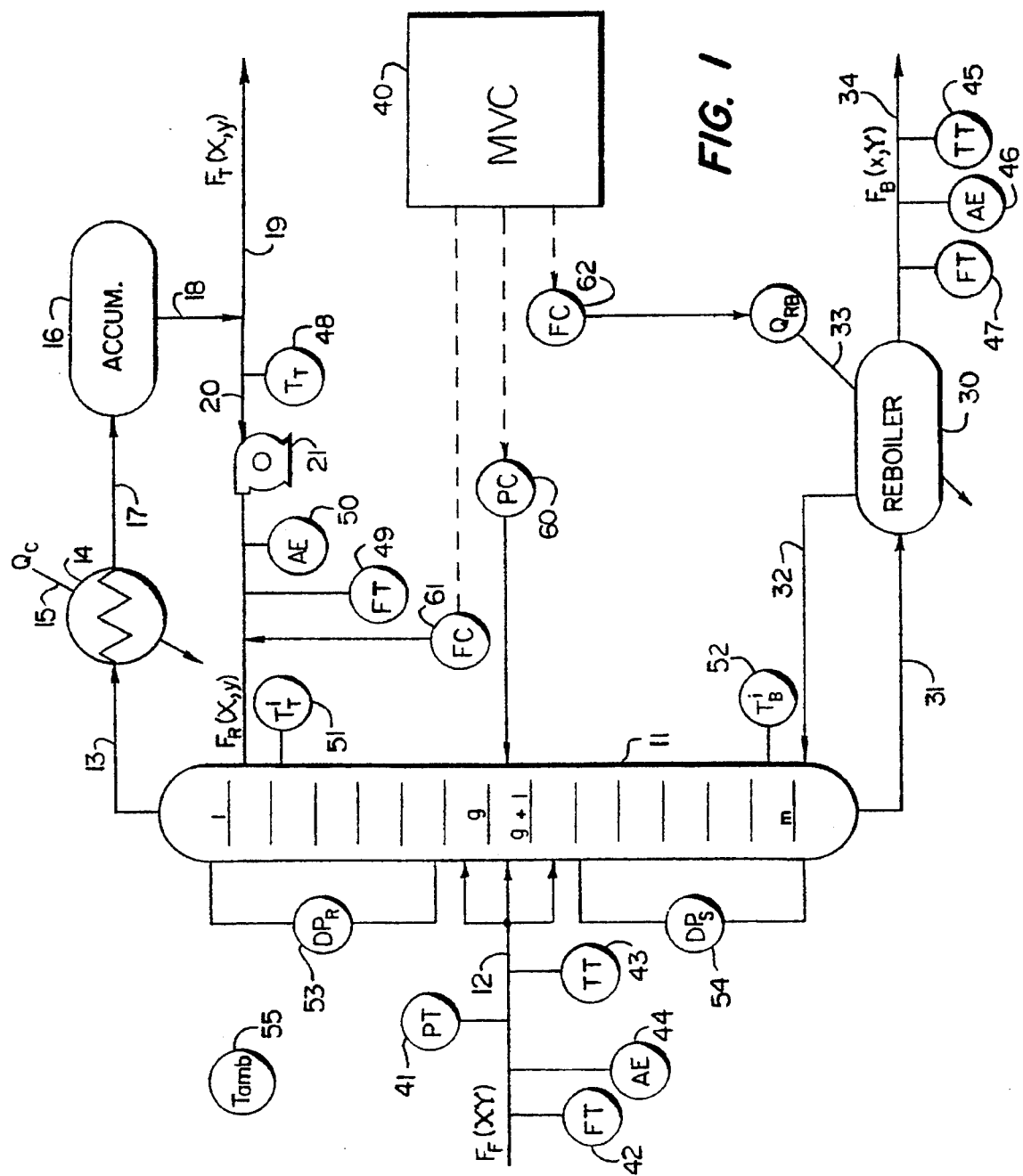
FIG. 1 is a schematic diagram of a fractional distillation process illustrating the optimization control features of the present invention.

Referring in greater detail to FIG. 1 of the accompanying drawings, there is illustrated a gas fractionation process employing the principles of the present invention. As noted, gas fractionation is only one of various different types of processes to which the control techniques of the present invention apply; accordingly, the invention should not be construed as limited in its application to the particular process described herein. A fractional distillation column 11 receives incoming raw product via input conduit 12, the raw product in this case being a liquid and/or gas made up of hydrocarbon constituents. Column 11 includes a rectification section having trays 1 through g and a stripping section having trays g+1 through m. An overhead vapor stream is withdrawn from column 11 via conduit 13 and is conducted to heat exchanger 14 where thermal energy is exchanged between the overhead product $F_T$ stream and a cooling medium provided to the heat exchanger via a further conduit 15. The condensed overhead product is then passed to an accumulator 16 via a conduit 17. Liquid is withdrawn from accumulator 16 via conduit 18 and split between the overhead product output conduit 19 and a reflux conduit 20 under the control of a reflux pump 21. Reflux flow $F_R$ is delivered back to column 11 via conduit 22.

A reboiler 30, typically embodied as a heat exchanger, receives the bottoms product from column 11 via conduit 31 and, after adding heat, returns the product to the column through conduit 32. Heat $Q_{RB}$ is supplied to reboiler 30 through pipe 33. The reboiler also provides the bottoms product output flow $F_B$.

In accordance with the present invention, the process illustrated in FIG. 1 is controlled by a multivariable controller (MVC) 40 in the manner described hereinbelow. In particular, in the process illustrated in FIG. 1, feed line or conduit 12 supplies an output feed flow $F_F$ comprising, in this example, a pseudo-binary mixture of hydrocarbon constituents x and y, where x is a lower boiling constituent, (i.e., light) and y is a higher boiling constituent (heavy). For example, x might be ethane (and lighter) and y might be propane (and heavier) in a typical process. The objective of the MVC controller is to separate constituents x and y at a maximum profit within a predetermined purity specification for the separated products, within the process and contractual constraints, and at reduced process variability. The manipulated variables controlled by MVC 40 to achieve these objectives are reflux $F_R$, reboiler heat duty $Q_{RB}$ and column pressure $P_C$. The target controlled variables affected by the manipulated variables are: the top specification, namely optimum concentration of heavy key (y) in the top product (X), and the bottom specification, namely the optimum concentration of light key (x) in the bottom product (Y). The field variables periodically polled by controller 40 to effect control over the manipulated variables are sensed and transmitted by a variety of transducer units appropriately located to sense the levels of respective variables and transmit the sensed levels as signals to controller 40 when sequentially queried in a conventional telemetric manner. In this regard, it must be pointed out that, for the sake of clarity in the drawing, connecting links between MVC 40 and the various field variable transmitters are not shown, it being understood however that polling can be effected by a hard wired or remote link transmission medium.

The field variable transmitters include a pressure transmitter 1, a flow transmitter 42 and a temperature transmitter 43 to sense and transmit to controller 40 the pressure, flow and temperature levels, respectively, of input feed flow $F_F$. An on-line analyzer 44 senses and transmits the composition (i.e., the percent x and percent y) present in the input feed flow $F_F$. Similarly, the temperature, composition and flow rate in the bottom product output flow $F_B$ from reboiler 30 in conduit 34 are sensed and transmitted by temperature transmitter 45, analyzer 46 and flow transmitter 47, respectively. The temperature of the overhead product $F_T$ in conduit 20 upstream of the reflux pump 21 is measured and transmitted to MVC 40 by temperature transmitter 48. The flow and composition of the reflux $F_R$ downstream of pump 21 are measured and transmitted by flow transmitter 49 and on-line analyzer 50, respectively. On-line analyzers 44 and 50 are typically gas chromatograph units that are commercially available. The inference temperature near the top of column 11, and the inference temperature near the bottom of the column, are sensed and transmitted by temperature transmitters 51 and 52, respectively. The differential pressure across the rectification section (1 through g) of the column and the differential pressure across the stripping section (g+1 through m) of the column are measured and transmitted by respective pressure transmitters 53 and 54. Ambient temperature is transmitted to MVC 40 from the ambient temperature transmitter 55.

Manipulated variable $P_c$, the pressure in column 11, is adjusted by a pressure controller 60 under the control of MVC 40. Reflux flow FR, another manipulated variable, is adjusted by flow controller 61, also under the control of MVC 40. The other manipulated variable, the amount of heat and cooling per unit time (i.e., heat duty $Q_{RB}$), is controlled by MVC 40 through a flow controller 62 controlling the steam passing through conduit 33.

Figure 2:
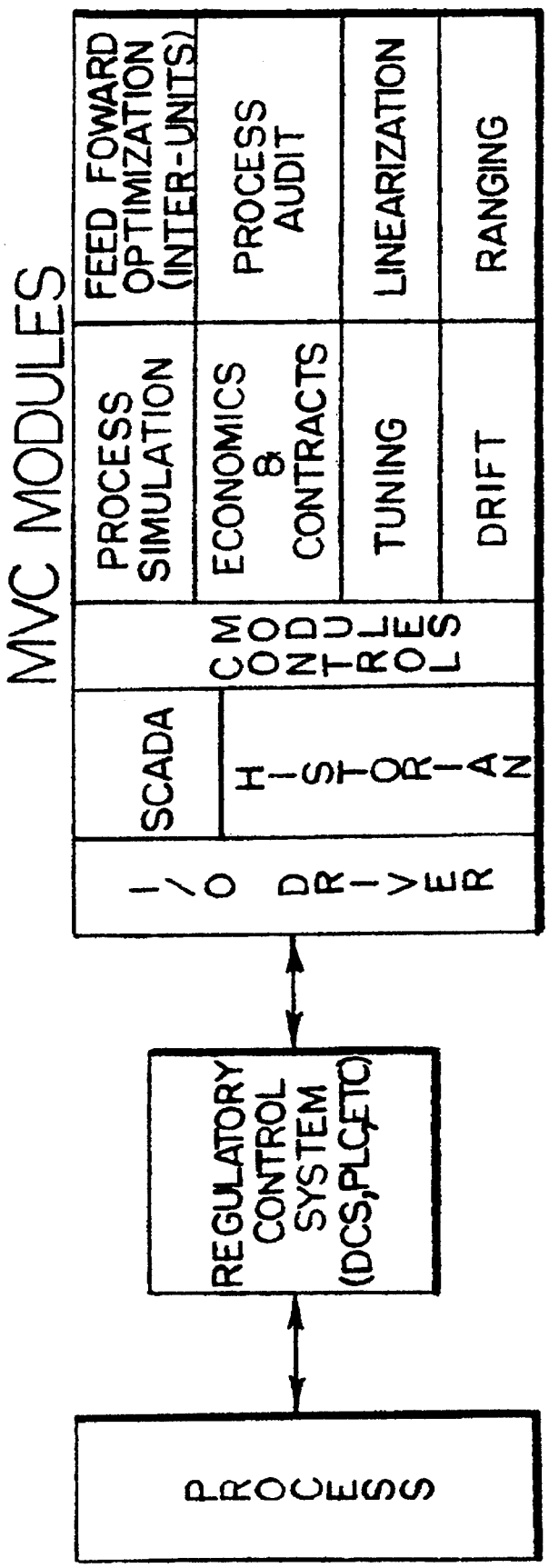
FIG. 2 is a block diagram of the components of the multivariable control system of the present invention.

FIG. 2 illustrates the essential features of the computer-resident MVC modules and their interface with the controlled plant process. An MVC module defines a self-contained process unit having a distinct process function. For example, a fractionating column and its associated equipment (e.g., condensers, reboilers, other heat exchangers, pumps, compressors, etc.) constitute such a module. With respect to the control aspects of such a process module, it is typical for equipment such as valves, pumps, etc. to be controlled in a predetermined pattern by a regulatory control system such as a DCS (distributed control system), a PLC (programmable logic control), or single loop controllers (either pneumatic or electronic). In prior art systems, the regulatory control system is generally located in a control room where the operator either manually adjusts the setpoints of each manipulated variable or permits the regulatory control system to automatically adjust these setpoints. In the automatic mode of such systems, setpoint adjustment of a manipulated variable is effected on the basis of feedback information specifically relating to that variable. In the present invention, however, these setpoints of the manipulated variables are instead adjusted optimally on the basis of both feedback and feed-forward information relating not just to that variable but to all variables (i.e., process, economic, contractual and calculated variables) simultaneously.

The MVC modules software resides in a computer which can be a personal computer, workstation, or other type of computer hardware. In the preferred embodiment, the computer employed is a high speed 32-bit personal computer. As illustrated in FIG. 2, the multivariable control (MVC) system of the present invention effects two-way communication with the regulatory control system through its I/O driver. The driver is a conventional type communication protocol translator for input and output signals between the modules and the regulatory control system. These I/O signals are managed by the sequencing control and data acquisition (SCADA) software, a commercially available software that functions as a data acquisition system for the MVC of the present invention. As the SCADA acquires data from the process: it sends the data to the various software blocks for use in performing the corresponding system operations; and it simultaneously dumps the same data into the historian block, serving as archival storage, so that the data can be available for comparisons as described herein. Both the SCADA and the historian software permit the system to easily obtain access to both current and historical process data. SCADA polls all process variables, both manipulated and other, through the I/O driver, usually every one or two seconds.

The MVC modules are the executive software of the system and are described in detail below. Their function is to generate the optimal setpoints for all manipulated variables in every optimization cycle.

Before the system can be operated, it is necessary to load the multivariable control equations into the control modules section of the computer. These equations express the relationships among polled variables, system economics (i.e., differential prices of X and Y products, utility costs for providing condenser and reboiler energy loads, and pumping costs), constructional constraints and specifications (i.e., maximum levels of impurities in the top and bottom products), equipment constraints (i.e., for the column, condenser, accumulator, reboiler, pumps, etc.) and process and analyzer dynamics. Typical multivariable control equations utilized for the exemplar process described herein include: Manipulated Variable $F_R$: Reflux Duty
Manipulated Variable $Q_{RB}$: Reboiler Duty $$Q_{RB} = a'F_f^{m'} + b'(1/T_f)^{n'} + c'P_{f,c}^{q'} + d'K_{f,j}^{r'} + e'K_{f,i,k}^{s'} + fN_{strip}^{t'} + g'((1/T)_{amb} - (1/T)_{strip})^{u'} + \ldots$$

Manipulated Variable $P_c$: Column Pressure $$P_c = a''K_{f,ijk}{}^{r''} + b''(p^o/p^o{}_j)^{v''} + c''(N_{rect}N_{strip})^{w''} + \ldots$$

Where:
  a,b,c,d,e,f,g,; a',b',c',d',e',f',g'; a'',b'',c''; etc, are numerical coefficients characteristic of the particular distillation column used and are changeable when mechanical changes are made in the system, F is flow, T is absolute temperature, P is pressure, K is composition, N is number of theoretical fractionation stages, $p^o$ is saturation vapor pressure (of a component), and where subscripts: f=feed, c=column, i,j,k=component), components (e.g., light key, heavy key, etc), rect=rectification section of a column, strip=stripping section, amb= ambient, and where exponents m, n, q, r, s, t, u, m', n', q', r', s', t', u', r'', v'', w'' are constants.

The function of the described equations is to permit the control modules software routines to simulate process operation, based on process variable data received from the SCADA, on a continuing basis. The simulations thus follow actual plant or process performance to permit prediction of the optimal setpoints of the manipulated variables, subject to the process economic, contractual and equipment constraints provided by the appropriate MVC module routines.

Figure 3:
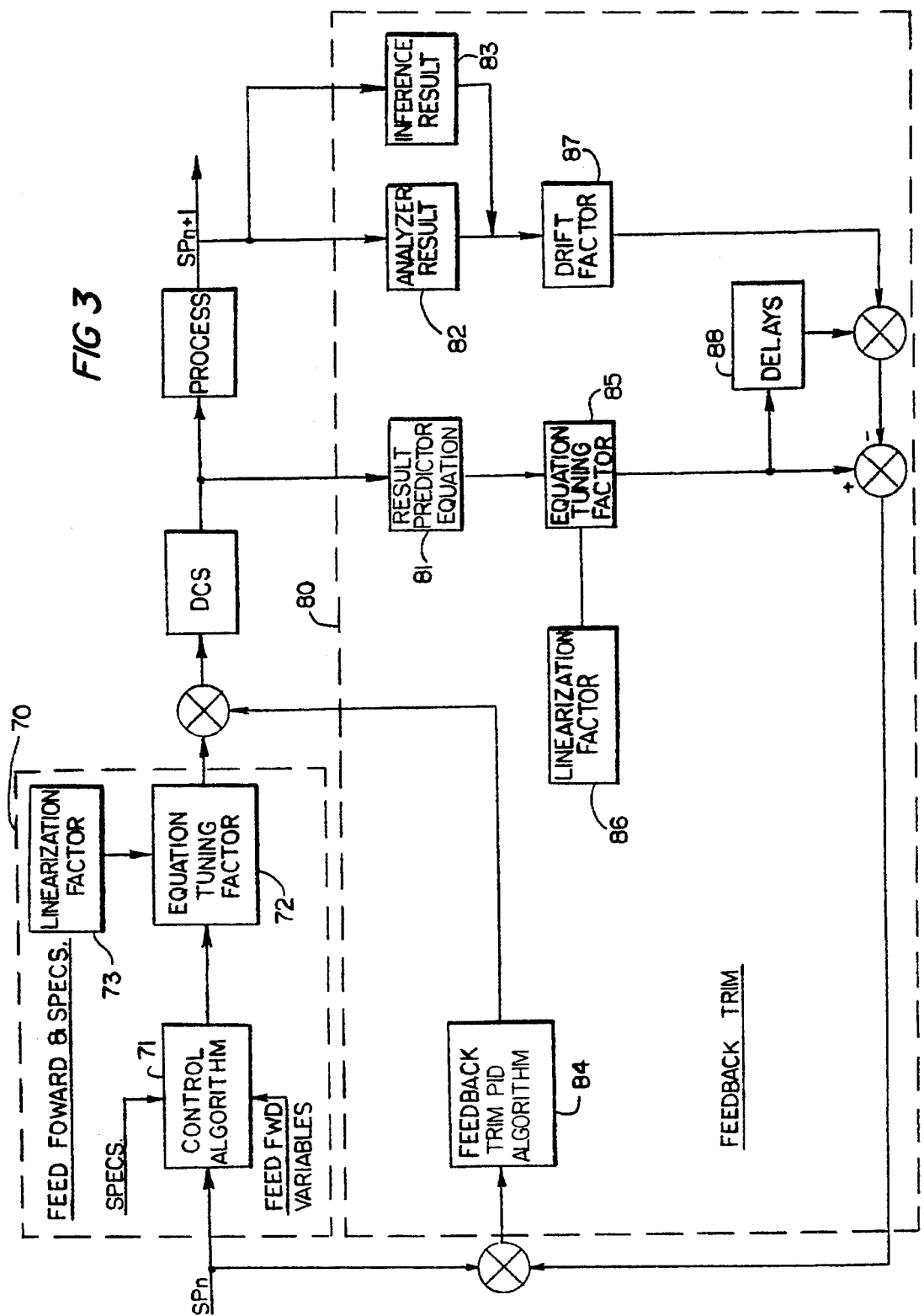
FIG. 3 is a schematic diagram illustrating the feedback trim procedure utilized in the process control system of the present invention.

In FIG. 3 of the accompanying drawings there is illustrated a functional block diagram representing the sequence of events during a typical optimization cycle of system operation. In this regard, optimization cycles occur at regular intervals, pre-selected by the operator, with a typical frequency being in the range of one-half to five minutes. During each cycle the entire process or plant is optimized. The specific optimization cycle illustrated in FIG. 3 is the (n+1)th cycle, the start of which occurs with the application of the $SP_n$ signal level to the control algorithm software block 71. SP represents the setpoint for any one of the manipulated variables, and $SP_n$ represents the value of that setpoint in the preceding (i.e., nth) cycle. The values of all relevant feed-forward variables (e.g., input feed flow rate, input feed composition, input feed temperature, etc.) are also applied to the control algorithm block 71 along with all applicable process specifications (e.g., product purity, economic requirements, contractual constraints, etc.). All of the feed-forward variable and process specifications are employed in control algorithm 71 to compute the value $SP_{n+1}$ of the optimal setpoint of the manipulated variable during the current (i.e., n+1) cycle.

Before the feed-forward-derived setpoint value $SP_{n+1}$ is used in the process, a feedback trim correction is performed. Specifically, the obtained actual process result from analyzer result block 82 is compared with the predicted result derived from the result predictor equation 81. The actual process result used for this comparison may be derived as the analyzer result from block 82 or the inference result from block 83. The difference between the predicted and actual results is sent to feedback trim PID algorithm 84 which derives the appropriate feedback correction to the feed-forward derived value of the manipulated variable setpoint.

Both the feed-forward and specifications section 70 and the feedback trim section 80 are automatically tuned, linearized, drifted and/or delayed to assure continuous adaptability of the optimization calculations to the changing performance and dynamics of the process units. In particular, the equation tuning factors 72 and 85 represent software routines that automatically check for trends in differences between feed-forward-predicted and feedback-observed values stored in the historian software. These trends, signifying possible changes in system performance, are statistically analyzed and appropriate tuning factors are derived in order to keep the magnitude of feedback trim corrections to a minimum. To manually reset the tuning procedure on the computer, the system operator retrieves and displays the equation tuning menu listing the various tuning equations utilized by the system. On keystroke command, the operator may then reset the feedback trim operation for each major process parameter. On an automatic basis, the tuning program recalls the differences between predicted and observed parameter values over a pre-specified period of time (e.g., one work shift) and computes the appropriate correction factor for each predictive equation. Thus, the procedure compensates for any systematic drift in performance of a process component, whether due to gradual fouling, changes in variables that have not been accounted for, or simply imperfection of the system control modules themselves.

The linearization factors 73 and 86 represent software routines similar to the tuning factor routines but are invoked when significant mechanical changes are introduced into the system. Examples of such mechanical changes are changes or additions in piping, pumps, heat exchangers, etc. Thus, the function of the linearization factor routines 73, 86 is to re-calibrate the plant or system following mechanical changes. The linearization factor program is evoked in a similar manner as described for the equation tuning program. The operator may retrieve and display the linearization factor menu whenever a mechanical change has been made in the system. In this case, however, the computer derives new numerical values for each coefficient of every affected term of the system equations rather than providing a single new overall correction factor for each equation.

The drift factor routine 87 enables the operator to automatically correct for drifts in key instruments, for example a gas chromatograph. Once again, the operator summons the drift factor menu and, for each time-identified process sample on the screen, enters the results of same time-identified performed laboratory analyses. The system retrieves the corresponding on-line analyzer values, computes the resulting correction or drift factor for each selected component and, if approved by the operator, installs these factors into the system by key actuation.

The delays software 88 represents routines for automatically adjusting for the dynamic characteristics of the process and the measuring instruments. In the example illustrated in FIG. 3, delays 88 represent the sum of the process dead time (i.e., from the feed entry to the analyzer sampling time) and dead time of the analyzer 82 itself. Thus, the value from the result predictor equation 81 is computed at a delay time prior to the time of the actual computed result from the analyzer result block 82.

The inference result block 83 represents a computation of the composition of the resulting product as inferred from the measurement of temperature, for example. Inference results are utilized because of the rapid dynamic response of temperature measuring devices as compared to on-line analyzer response times.

The resulting feedback trim from block 84 is added as a modifier to the derived setpoint from the feed-forward and specification section 70 in order to generate, and to dispatch to the process, the validated optimal setpoint value $SP_{n+1}$ for the manipulated variable during the (n+1)th optimization cycle of the process.

Figure 4:
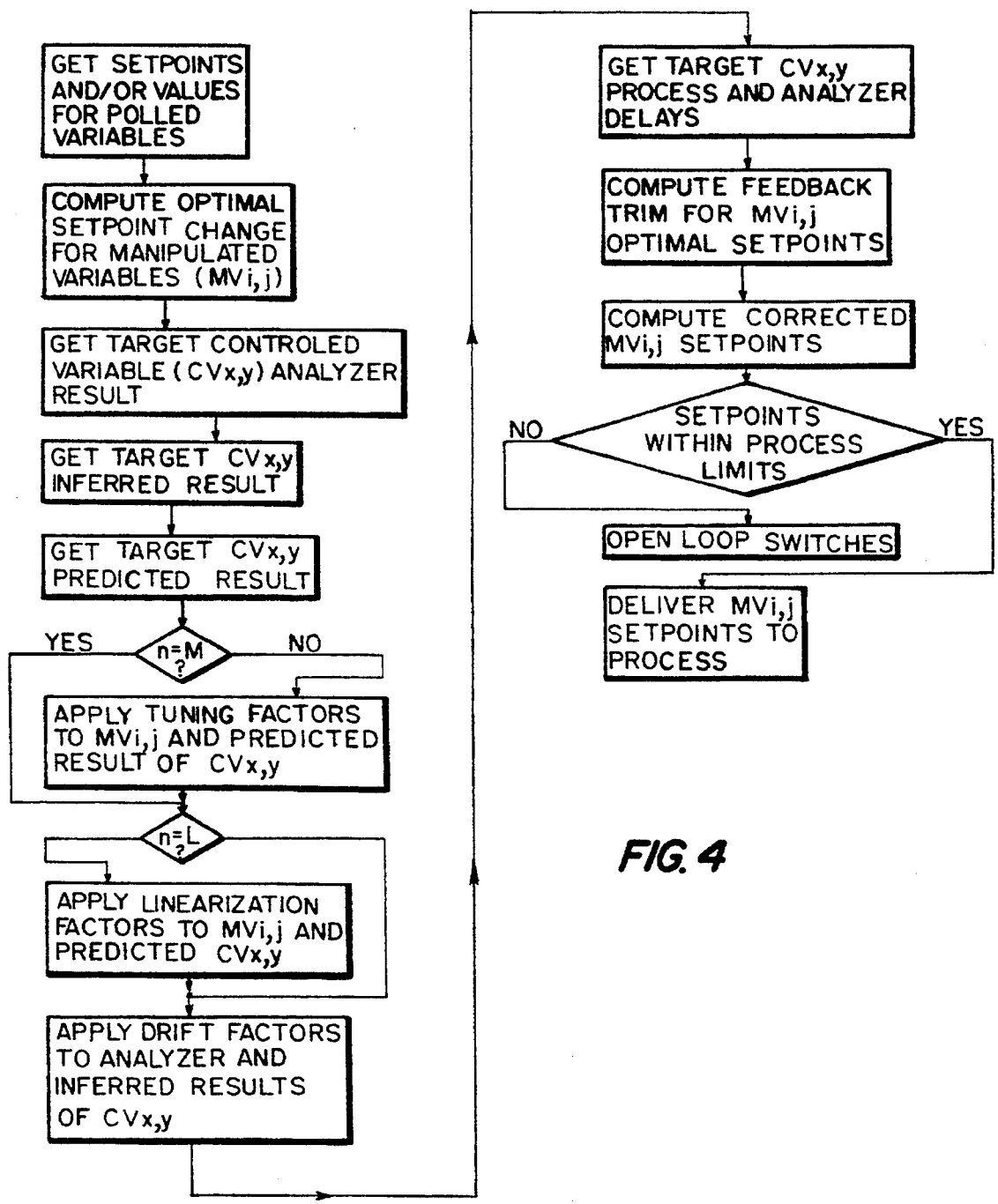
FIG. 4 is a flow chart of a program that can be used to implement the present invention.

The software for effecting an optimization cycle is represented by the flowchart illustrated in FIG. 4 to which specific reference is now made. It is understood that the equations described above have been loaded into the control modules, and that the system has been initialized. The initialization process includes setting the system clock and activating the I/O driver, SCADA and historian. Also initialized are the various MVC modules, the control modules and the open/closed loop switches. These switches permit manually controlled open loop operation of the process at the operator's selection or under certain circumstances such as the computed setpoints exceeding limit values established in the ranging module routine. Further, initialization includes selection by the operator of optimization cycle frequency, and the numbers M and L in determining the frequencies of tuning and linearization procedures.

As illustrated in the flowchart, each optimization cycle begins by polling all of the process variables shown in FIG. 1 as being monitored. These include flows, temperatures, pressures, compositions of fluids, etc. Polling is performed over adjustable time intervals characteristic of sensor response times in the process. Once the data has been collected, the optimal setpoint change, for example, for the reflux flow $F_R$ is computed. Before this setpoint change can be dispatched by MVC 40 (FIG. 1) to the reflux flow controller 61, the predicted reflux composition that would result from such change is compared to the inferred reflux composition (block 83, FIG. 3) based on the inference temperature $T_T^i$ at the top of column 11 as monitored by temperature sensor 51. In addition, the predicted reflux composition is compared to the actual reflux composition (block 82, FIG. 3) measured by analyzer 50 (FIG. 1). These comparisons are made with the appropriate process delays (block 88, FIG. 1) appropriately incorporated. The predicted differences, corresponding to the feedback trim, provide the feedback modification to the computed optimal setpoint change for the reflux flow $F_R$. The thusly modified change in the setpoint is dispatched to the reflux flow controller 61. Still as part of the first optimization cycle (i.e., n=1), a similar procedure to that described above for the reflux flow $F_R$ is performed for each of the other manipulated variables (i.e., $Q_{RB}$ and $P_c$).

Once the first optimization cycle is completed for all of the manipulated variables, the same procedure is repeated automatically for M−1 optimization cycles, where M is preselected during the initialization of the system. Information received and derived in each of these cycles is routed to the historian module. Among this information is the difference between the feed-forward prediction and the actually observed results of product purity, etc.

During the Mth optimization cycle, usually after several hours of operation, the equations tuning process begins. That is, in the program illustrated in FIG. 4, tuning proceeds upon a determination that n is equal to M. Without interruption of the optimization procedure, the accumulated differences between predictions and measured results (e.g., predicted versus actual top and bottom product purities) are examined for systematic trends, if any. The derived tuning factors from such examinations are then applied as changes to the scaling factor for appropriate predictor and control equations. In other words, the computed setpoint change is scaled up or down in magnitude pursuant to the derived tuning factor. In this manner, the required feedback trim corrections become smaller on the basis of system experience, namely accumulated differences between the predicted and actual results in preceding optimization cycles.

Similarly, during the Mth cycle, drift factors are applied as multipliers to observed values of on-line variables against measured calculations. For example, time-stamped laboratory calibrations of on-line analyzers 44, 50 and 46 for the feed $F_F$, reflux $F_R$ and bottom $F_B$ streams, respectively, are utilized for automatic statistical application for drift factors to the on-line readings. Likewise, time-stamped calibrations of the top and bottom inference temperature monitors 51 and 52, respectively, against the readings of the corresponding on-line analyzers are employed for automatic calculation of drift factors for the inferred on-line compositions at block 83.

Equation tuning and drift factor applications are effected during every Mth optimization cycle. As noted above, M is set by the operator and typically provides for several hours of operation between successive tuning processes.

The system also has the flexibility of adapting to plant or mechanical changes. For example, if condenser surfaces are added, or the feed entry position is changed, or components are changed or added, an automatic relinearization procedure is invoked without interruption to the optimization cycle process. In the illustrated example, relinearization is invoked every L optimization cycles, typically providing a few days between each relinearization. In contrast to the effect of the equation tuning process (wherein the entire equation scaling factor is modified), relinearization results in modification of specific coefficients of terms making up the predictor and control equations. These modifications are made as calibration requirements demand, typically requiring, as noted, a few days of predicted versus observed results after a plant change is made.

The system as described herein is a multivariable advanced control system designed for on-line optimal control of continuous processes. The system computer may be a personal computer or workstation and has software drivers connecting it to the plant regulatory control system. Utilizing modules of rigorous process simulations tuned to actual plant performance, the system continuously polls the many field variables and then predicts optimal setpoints for control of manipulated process variables, subject to plant economic, contractual and equipment constraints. The manipulated process variables are optimized approximately every thirty seconds (or every few minutes, if desired). A major system feature is its adaptability in that, before each pre-processed, economics-based and feed-forward-based optimal setpoint is dispatched to the process, a feedback trim based on actual versus predicted process reactions is computed. Process delays, critical equipment constraints, performance and instrument drift are updated on-line through self-tuning routines.

Standardized manipulated variable setpoint equations are employed and have coefficients tailored to the process unit. To eliminate data problems associated with fixed gain mechanistic models, the equations are calibrated over the range of unit operation.

The system automatically compensates for process dynamics, feed composition or rate for a varying set of product specifications, prices and utility costs, resulting in economic factors employed to set optimum operating setpoints. The advantage of adaptive feed-forward control is its ability to react to these continuous changes and predict anticipated results, with appropriate time offset for the process transaction times, before the system strays from specification constraints. The resulting capability of optimizing control, without exceeding or underperforming product specification, increases the profitability of the system.

The system of the present invention is one level of control above the plant regulatory control system. In the event of failure or out-of-range operation, the operator can resort to regulatory open loop control. However, with the present invention on-line, the operator simply provides desired operating targets, product specifications and equipment selections. The system optimally sets the operating process conditions to best achieve target requirements. Economic and engineering information can be entered manually as required by the operator or received from remote locations. The operator has the option of manually entering optimal component recovery values from the economics module or having these entries made automatically by the system. The economics module provides the operator with a current optimal target for end product recovery at any given set of process conditions. These data are shown on a screen that can be displayed at the operator's initiation. Optimal product recovery is typically shown as a function of flow component values, utility costs, and the like, changes in these economic parameters are entered via keyboard by the operator or other authorized person. Alternatively, these factors can be entered from remote locations.

The operator is also provided with the ability to turn each of the MVC modules on or off. In the on position, the system operates in closed loop and resets the manipulated variable setpoints directly. In the off position, the system still receives and processes all information on-line, including computation of the optimal setpoints, but stops short of actually dispatching such setpoints to the process.

Another feature of the system is its ability to adapt automatically to different ranges of operation under the control of the ranging module in FIG. 2. Specifically, in certain processes, such as gas processing, the input feed and output feed are subject to enormous changes in flow rates. The function of the ranging module is to automatically switch from one set of equations to another set of equations as parameters approach the end of one range and the start of another. In essence, this amounts to reconfiguring the simulated system or model to accommodate different ranges of operation. The equations reside in RAM in the computer. So, for example, one set of equations may be invoked when the system is operating in the range between twenty percent of normal throughput to seventy percent of normal throughput; another set of equations may be invoked for operating ranges between seventy percent and one hundred fifty percent of normal throughput; etc. The equations for each parameter in the different ranges remain the same in form, only their coefficients differ.

Another important feature of the present invention is the frequent optimization control. Specifically, optimization cycles, occurring on the order of every thirty seconds, reduce the impact on the system of severe variability of inflow and outflow conditions and the volatility of economic parameters.

From the foregoing description it will be appreciated that the invention makes available a novel multivariable process control method and apparatus for optimizing plant process control in the presence of large scale variations in input and output conditions and highly volatile economic parameters affecting the processed product.

Having described a preferred embodiment of the new and improved multivariable process control method and apparatus of the present invention, it is believed that other modifications, variations and changes will be suggested to those skilled in the art in view of the teachings set forth herein. Accordingly, it is to be understood that all such variations, modifications and changes are believed to fall within the scope of the present invention as defined by the appended claims.

What is claimed is:

1. In a process wherein input feed having at least one fluctuating parameter is processed to yield an output feed, and wherein at least one controlled variable in the output feed varies in response to changes in the setpoint of at least one manipulated variable, a method for varying the manipulated variable setpoint to achieve an independently variable target level of the controlled variable, said method comprising the steps of:

(a) polling and collecting a plurality of process parameters affecting the controlled variable and affected by the manipulated variable;

(b) in response to the process parameters collected in step (a) and to the present value of the manipulated variable setpoint, determining the difference between said present value and an optimal value for the manipulated variable setpoint for achieving the target level of the controlled variable;

(c) in response to process parameters collected in step (a) and to the difference determined in step (b), predicting the level of the controlled variable that would result from applying said optimal manipulated setpoint value to the process;

(d) obtaining the present level of the controlled variable;

(e) comparing said predicted result from step (c) with said present level obtained in step (d) to provide a feedback signal;

(f) in response to said feedback signal and to the present value of the manipulated variable setpoint, modifying said difference determined in step (b) so that said optimal manipulated variable setpoint value more closely achieves the target level of the controlled variable; and (g) applying a signal representing the modified optimal setpoint value derived in step (f) to control the manipulated variable setpoint in the process and thereby control the controlled variable in said output feed;

wherein steps (a) through (g) constitute an optimization cycle regularly repeated at a predetermined frequency;

wherein step (d) includes the steps of:

(d.1) directly measuring the actual present level of the controlled variable; and (d.2) inferring the present level of the controlled variable from at least one related process parameter collected in step (a);

and wherein step (e) comprises comparing said predetermined result from step (c) with both the measured actual level obtained in step (d.1) and the level inferred in step (d.2) to provide said feedback signal;

and further comprising the steps of:

(h) storing, for each optimization cycle, the difference determined in step (b) and the actual level of the controlled variable measured in step (d.1); and (i) during every Mth optimization cycle, incorporating a tuning factor into said feedback signal to reduce the magnitude of the modification required in the difference determined in step (b) to achieve the target value of the controlled variable, wherein said tuning factor is derived from trends in said difference and said actual level stored in step (h);

wherein M is a predetermined multiple of optimization cycles of such magnitude as to encompass a plurality of hours;

wherein step (i) includes modifying said feedback signal by modifying the entirety of said polynomial by a common scaling factor;

and further comprising the step of:

(j) after every L optimization cycles, recalibrating the process to accommodate variations in process performance resulting from changes, deletions or additions of process equipment, the variations in performance being observed from the differences and levels stored in step (h);

wherein L is a multiple of optimization cycles encompassing a time frame on the order of a few days.

2. The method of claim 1 further comprising the step of adjusting the level of said feedback signal to accommodate lag times inherent in the process.

3. The method of claim 1 wherein step (b) includes computing said optimal manipulated variable setpoint value from a stored polynomial wherein each term includes a coefficient and at least one variable, each at least one variable corresponding to a respective process parameter collected in step (a).

4. The method of claim 1 further comprising the step of adjusting the level of said feedback signal to accommodate lag times inherent in the process.

5. The method of claim 1 wherein there are a plurality of said controlled variables responsive to changes in setpoints of three manipulated variables, and wherein the steps in each optimization cycle are performed separately and in respective sequences for each of the three manipulated variables.

6. The method of claim 5 wherein said process is a gas fractionation process, wherein the input feed is a gas having at least first and second constituents, wherein the process utilizes a fractionation column to separate the gas constituents into top product flow egressing from the top of the column and bottom product flow egressing from the bottom of the column, wherein said controlled variables are the concentration of said first constituent in the top product flow and the concentration of said second constituent in said bottom product flow, and wherein said manipulated variables are the pressure in the fractionation column $P_C$, reflux flow rate $F_R$ of the top product back into the column, and the rate of heating of flow $Q_{RB}$ of the bottom product back into the column.

7. The method of claim 6 wherein step (a) includes:

determining the optimal setpoint value of $F_R$ by calculation from a first polynomial, namely:

$$F_R = aF_f^m + b(1/T_F)^n + cP_{f,c}^q + dK_{f,i}^r + eK_{f,j}^s + fN_{rect}^s + g((1/T)_{amb} - (1/T)_{rect})^u + \ldots$$

determining the optimal setpoint value for $Q_{RB}$ by calculation from a second polynomial, namely:
Manipulated Variable $P_c$: Column Pressure $$P_c = a'K_{f,ijk}^{r'} + b''(p^o_i/p^o_j)^{v'} + c''(N_{rect},N_{strip})^{w'} + \ldots$$

and determining the optimal setpoint for $P_c$ by caluclation from a third polynomial, namely:

$$P_c = a''K_{f,ijk}^{4''} + b''(p^o_i/p^o_j)^{v''} + c''(N_{rect},N_{strip})^{w''} + \ldots$$

where a,b,c,d,e,f,g,; a',b',c',d',e',f',g',; a'',b'',c''; etc, are numerical coefficients characteristic of the particular distillation column used and are changeable when mechanical changes are made in the system, F is flow, T is absolute temperature, P is pressure, K is composition, N is number of theoretical fractionation stages, $p^o$ is saturation vapor pressure (of a component), and where subscripts: f=feed, c=column, i,j,k=components (e.g., light key, heavy key, etc), rect=rectification section of a column, strip=stripping section, amb=ambient, and where exponents m, n, q, r, s, t, u, m', n', q', r', s', t', u', r'', v'', w'' are constants.

8. The method of claim 1 wherein said one fluctuating parameter is subject to unpredictable changes in level on the order of at least one hundred percent.

9. In a process wherein input feed having at least one fluctuating parameter is processed to yield an output feed, and wherein at least one controlled variable in the output feed varies in response to changes in the setpoint of at least one manipulated variable, a method for varying the manipulated variable setpoint to achieve an independently variable target level of the controlled variable, said method comprising the steps of:

(a) polling and collecting a plurality of process parameters affecting the controlled variable and affected by the manipulated variable;

(b) in response to the process parameters collected in step (a) and to the present value of the manipulated variable setpoint, determining the difference between said present value and an optimal value for the manipulated variable setpoint for achieving the target level of the controlled variable;

(c) in response to process parameters collected in step (a) and to the difference determined in step (b), predicting the level of the controlled variable that would result from applying said optimal manipulated setpoint value to the process;

(d) obtaining the present level of the controlled variable;

(e) comparing said predicted result from step (c) with said present level obtained in step (d) to provide a feedback signal;

(f) in response to said feedback signal and to the present value of the manipulated variable setpoint, modifying said difference determined in step (b) so that said optimal manipulated variable setpoint value more closely achieves the target level of the controlled variable; and (g) applying a signal representing the modified optimal setpoint value derived in step (f) to control the manipulated variable setpoint in the process and thereby control the controlled variable in said output feed;

wherein steps (a) through (g) constitute an optimization cycle regularly repeated at a predetermined frequency; and (h) in response to a command, dynamically switching during on-line operation between different process modes wherein the manipulated variable and controlled variable are different in each mode.

10. The method of claim 9 further comprising the step of adjusting the level of said feedback signal to accommodate lag times inherent in the process.

11. The method of claim 9 wherein step (b) includes computing said optimal manipulated variable setpoint value from a stored polynomial wherein each term includes a coefficient and at least one variable, each at least one variable corresponding to a respective process parameter collected in step (a).

12. The method of claim 9 further comprising the step of adjusting the level of said feedback signal to accommodate lag times inherent in the process.

13. The method of claim 9 wherein there are a plurality of said controlled variables responsive to changes in setpoints of three manipulated variables, and wherein the steps in each optimization cycle are performed separately and in respective sequences for each of the three manipulated variables.

14. The method of claim 13 wherein said process is a gas fractionation process, wherein the input feed is a gas having at least first and second constituents, wherein the process utilizes a fractionation column to separate the gas constituents into top product flow egressing from the top of the column and bottom product flow egressing from the bottom of the column, wherein said controlled variables are the concentration of said first constituent in the top product flow and the concentration of said second constituent in said bottom product flow, and wherein said manipulated variables are the pressure in the fractionation column $P_C$, reflux flow rate $F_R$ of the top product back into the column, and the rate of heating of flow $Q_{RB}$ of the bottom product back into the column.

15. In a process wherein input feed having at least one fluctuating parameter is processed to yield an output feed, and wherein at least one controlled variable in the output feed varies in response to changes in the setpoint of at least one manipulated variable, a method for varying the manipulated variable setpoint to achieve an independently variable target level of the controlled variable, said method comprising the steps of:

(a) polling and collecting a plurality of process parameters affecting the controlled variable and affected by the manipulated variable;

(b) in response to the process parameters collected in step (a) and to the present value of the manipulated variable setpoint, determining the difference between said present value and an optimal value for the manipulated variable setpoint for achieving the target level of the controlled variable;

(c) in response to process parameters collected in step (a) and to the difference determined in step (b), predicting the level of the controlled variable that would result from applying said optimal manipulated setpoint value to the process;

(d) obtaining the present level of the controlled variable;

(e) comparing said predicted result from step (c) with said present level obtained in step (d) to provide a feedback signal;

(f) in response to said feedback signal and to the present value of the manipulated variable setpoint, modifying said difference determined in step (b) so that said optimal manipulated variable setpoint value more closely achieves the target level of the controlled variable; and (g) applying a signal representing the modified optimal setpoint value derived in step (f) to control the manipulated variable setpoint in the process and thereby control the controlled variable in said output feed;

wherein steps (a) through (g) constitute an optimization cycle regularly repeated at a predetermined frequency;

wherein the process utilizes multiple process units in a plant and has an overall economic objective, and further including the step of (h) determining the overall economic objective by providing real time integration of the economics and control of all of process units.

16. The method of claim 15 further comprising the step of adjusting the level of said feedback signal to accommodate lag times inherent in the process.

17. The method of claim 15 wherein step (b) includes computing said optimal manipulated variable setpoint value from a stored polynomial wherein each term includes a coefficient and at least one variable, each at least one variable corresponding to a respective process parameter collected in step (a).

18. The method of claim 15 further comprising the step of adjusting the level of said feedback signal to accommodate lag times inherent in the process.

19. The method of claim 15 wherein there are a plurality of said controlled variables responsive to changes in setpoints of three manipulated variables, and wherein the steps in each optimization cycle are performed separately and in respective sequences for each of the three manipulated variables.

20. The method of claim 19 wherein said process is a gas fractionation process, wherein the input feed is a gas having at least first and second constituents, wherein the process utilizes a fractionation column to separate the gas constituents into top product flow egressing from the top of the column and bottom product flow egressing from the bottom of the column, wherein said controlled variables are the concentration of said first constituent in the top product flow and the concentration of said second constituent in said bottom product flow, and wherein said manipulated variables are the pressure in the fractionation column $P_c$, reflux flow rate $F_R$ of the top product back into the column, and the rate of heating of flow $Q_{RB}$ of the bottom product back into the column.

* * * * *